(12) United States Patent
Paren et al.

(10) Patent No.: US 7,754,048 B2
(45) Date of Patent: Jul. 13, 2010

(54) BLEACHING OF CELLULOSIC FIBRE MATERIAL WITH PEROXIDE USING POLYMERS AS A STABILISER

(75) Inventors: Aarto Paren, Vaasa (FI); Jukka Jäkärä, Siivikkala (FI); Ilkka Renvall, Espoo (FI); Jonni Ahlgren, Vaasa (FI); Riitta Laitinen, Oulu (FI); Jussi Nikkarinen, Vaasa (FI); Tapio Viitanen, Rauma (FI)

(73) Assignee: Kemira Oyj, Helsinki (FI)

( * ) Notice: Subject to any disclaimer, the term of this patent is extended or adjusted under 35 U.S.C. 154(b) by 670 days.

(21) Appl. No.: 10/541,775

(22) PCT Filed: Jan. 9, 2004

(86) PCT No.: PCT/FI2004/000010

§ 371 (c)(1),
(2), (4) Date: Mar. 10, 2006

(87) PCT Pub. No.: WO2004/063461

PCT Pub. Date: Jul. 29, 2004

(65) Prior Publication Data

US 2006/0144534 A1    Jul. 6, 2006

(30) Foreign Application Priority Data

Jan. 10, 2003  (FI) .................................. 20030040

(51) Int. Cl.
*D21C 3/00* (2006.01)
*D06L 3/02* (2006.01)
(52) U.S. Cl. ................. 162/78; 162/5; 162/6; 524/500; 8/111
(58) Field of Classification Search ............ 162/78, 162/5, 6; 524/500; 8/111
See application file for complete search history.

(56) References Cited

U.S. PATENT DOCUMENTS

| 4,238,282 | A | * | 12/1980 | Hyde | .................... | 162/76 |
| 4,347,099 | A | | 8/1982 | DeCeuster et al. | | |
| 4,363,699 | A | | 12/1982 | DeCeuster et al. | | |
| 4,916,178 | A | * | 4/1990 | Amati et al. | ................ | 524/401 |
| 6,120,556 | A | * | 9/2000 | Nishino et al. | ................ | 8/111 |
| 6,444,771 | B1 | * | 9/2002 | Yamaguchi et al. | ...... | 526/317.1 |

FOREIGN PATENT DOCUMENTS

| DE | 3 423 452 A1 | 1/1986 |
| EP | 0 414 228 A2 | 2/1991 |
| EP | 0 801 169 A1 | 10/1997 |
| EP | 0 814 193 A2 | 12/1997 |
| EP | 0 842 321 B1 | 4/2001 |

OTHER PUBLICATIONS

Machine English Translastion of DE 3423452 A, 1986, esp@cenet, whole document.*

* cited by examiner

*Primary Examiner*—Steven P Griffin
*Assistant Examiner*—Anthony J Calandra
(74) *Attorney, Agent, or Firm*—Birch, Stewart, Kolasch & Birch, LLP

(57) ABSTRACT

The present invention relates to a process for bleaching a cellulosic fibre material with a peroxide compound in an aqueous alkaline medium, comprising a bleaching step wherein: a) a first polymer (A) comprising a homopolymer of acrylic acid, methacrylic acid or maleic acid, or a copolymer of acrylic acid and/or methacrylic acid with an unsaturated dicarboxylic acid, and a solution of a second polymer (B) comprising a poly-alpha-hydroxyacrylic acid or a salt thereof, are added to a cellulosic fibre material, and b) thereafter adding a peroxide compound and an alkaline substance and carrying out the bleaching.

18 Claims, No Drawings

BLEACHING OF CELLULOSIC FIBRE MATERIAL WITH PEROXIDE USING POLYMERS AS A STABILISER

FIELD OF THE INVENTION

The present invention relates to a process for bleaching a cellulosic fibre material with a peroxide compound in an aqueous alkaline medium comprising a bleaching step wherein two different polymers are added to the cellulosic fibre material followed by the addition of the peroxide compound and an alkaline substance. The process can be used for bleaching mechanical, chemi-mechanical and de-inked pulps and for deinking recycled fibers without using silicate as a stabilizer.

DESCRIPTION OF THE RELATED ART

Alkaline silicate solutions normally called water glass has been used in stabilizing hydrogen peroxide solutions, which are used in alkaline peroxide bleaching of mechanical pulps. Nowadays it is more common not to make a pre-prepared bleaching liquor, but water glass is fed separately, when mechanical pulps are bleached with peroxide and alkali.

Water glass is used alone or together with peroxide in de-inking of recovered papers. Sometimes the de-inked pulp is also bleached with alkaline peroxide.

If the silicates, e.g. in form of the water carry-over, will enter the paper making process, they will disturb the papermaking process, e.g. by precipitating on hot surface, causing holes in the paper reel etc.

It is known that hydrogen peroxide will decompose very rapidly in an alkaline milieu in the presence of heavy metal (transition metal) ions. The most abundant of these ions in pulps are iron and manganese. The copper ion is also very detrimental for alkaline hydrogen peroxide, but normally it can enter the process only via used process waters.

It is also known that iron will start to precipitate already below pH 7, first in colloidal form. The formed iron hydroxides, oxyhydroxides etc are much more catalytically active than iron ions. Also manganese can, at least partly, be in precipitated form, but it has been shown that in the presence of hydrogen peroxide, manganese should be in dissolved form.

The theory of the function of water glass varies, but one theory is that water glass will deactivate the catalytic surface of iron and other heavy metal ion "precipitates". In order to avoid the detrimental effect of manganese ions, a chelating agent is often introduced into the bleaching process or the pulp will be pretreated with a chelating agent. The most common chelating agents are EDTA and DTPA, which belong to the group of polyaminopolycarboxylates. The corresponding phosphonates, EDTMPA and DTPMPA can be also used, but they are much more expensive than the polyaminopolycarboxylates. They have also the disadvantage that they contain phosphorus, which is not a wanted component, when the environmental regulations are becoming stricter and stricter.

According to above there is a need to replace water glass (silicates) in alkaline peroxide process and in pulping processes, which use water glass, e.g. in de-inking of recovered paper. There have been suggestions to use phosphonates, but they should used in quite high dosages and the phosphorus problem in the waste waters would still remain. Since the common phosphonates are non-biodegradable, there has been much studies about they adverse effect on mobilizing heavy metals, e.g. from sediments in waterways.

One solution to stabilize alkaline hydrogen peroxide solutions or to avoid water glass is based on the use of poly-alpha-hydroxyacrylic acid (PHAA). Typically this substance is used as a sodium salt of poly-alpha-hydroxyacrylic acid made from the corresponding lactone (an internal ester) by alkaline treatment (such as NaOH). Thus, the sodium salt of poly-alpha-hydroxyacrylic acid typically appears only as an aqueous alkaline solution. The lactone is not soluble in water. When the name PHAA is mentioned, it normally does not refer to the free acid, but to a salt thereof.

U.S. Pat. No. 4,363,699 describes a process for stabilizing alkaline solutions of peroxidic compounds used for bleaching wherein an alkali salt of a poly-alpha-hydroxyacrylic acid is added to the solution as a stabilizer.

EP 0 842 321 B1 describes a method of stabilizing alkaline bleaching liquors containing oxygen and/or hydrogen peroxide and three different types of chelating agents. The first one can be a phosphonate or an aminopolycarboxylic acid, and the second one can for example be poly-alpha-hydroxyacrylic acid used as a salt. The third one is a protein derivative.

EP 0 814 193 discloses a silicate-free stabilizing agent for peroxide-bleaching procedures, comprising a) a first component selected from homopolymers of alpha-hydroxyacrylic acid and copolymers of alpha-hydroxyacrylic acid with other comonomers, and water soluble salts and polylactones of the mentioned homo- or copolymers in combination with b) a second component selected from homopolymers and copolymers of acrylic acid, methacrylic acid and maleic acid, copolymers of at least one of the above-mentioned acids with other comonomers and salts of above-mentioned homo- and copolymers, and c) a third component selected from the common chelating acids DTPA and TTHA and salts thereof, and optionally d) a fourth component selected from water-soluble magnesium salts. The poly-alpha-hydroxyacrylic acid is used as its sodium salt.

EP 0 814 193 also describes a method of bleaching a fibre material comprising pretreating the fibre material with an aqueous solution of the above mentioned stabilizing agent typically for a period of one hour and at a pH of between 6 and 11, preferably between 7 and 10.5, and then bleaching the pretreated fibre material with an aqueous solution of a peroxide bleaching agent The pretreated fibre material is preferably washed before the bleaching.

EP 0 814 193 additionally describes a method of bleaching a fibre material comprising bleaching the fibre material with an aqueous alkaline peroxide bleaching liquor comprising the above mentioned stabilizing agent.

Nitrogen-containing chelating agents, like EDTA or DTPA have poor biodegradability and thus they increase nitrogen emissions to aquatic system. In the case where waste water is evaporated and the condensate is burned, nitrogen-containing compounds can increase NOX emissions. The stabilizing system should be nitrogen-free, since nitrogen emissions to air or to aquatic systems are not desired. It should also be noted that the complexing agents are commonly used as pretreatment in order to reduce transition metal content prior to bleaching. Addition of nitrogenous complexing agents into bleaching introduces more nitrogen in the process and thus increases nitrogen emissions (EDTA/DTPA into aquatic systems and/or NOX).

DE 3423452 discloses a solution for avoiding the use of water glass comprising a stabilizing mixture of a poly-alpha-hydroxyacrylic acid (PHAA) and a water soluble homopolymer of acrylic or methacrylic acid or a copolymer of acrylic acid and/or maleic acid. The salts, especially the sodium salt of PHAA and the sodium salt of the polycarboxylate polymer are mixed together. Chelating agents can be added to the mixture and thus an improved stabilizer mixture for bleaching processes is obtained. According to DE 3423452 the bleaching process is carried out by using an alkaline peroxide bleaching liquor containing said stabilizing mixture.

Since it is known that hydrogen peroxide will very easily decompose in alkaline solutions, a ready made bleaching mixture is not a very feasible choice when bleaching pulp with hydrogen peroxide in an alkaline milieu.

In EP 0 801 169 poly-alpha-hydroxyacrylic acid or the corresponding salts or polylactone is used in the alkaline peroxide bleaching of a chemical pulp at a temperature of above 100° C. and in the presence of a compound chosen from potassium hydroxide, sodium hydroxide and alkali metal or alkaline-earth metal carbonates.

THE INVENTION

It has been found that by using a mixture of a poly-alpha-hydroxyacrylic acid or a salt thereof and a polycarboxylate polymer made by homopolymerization of acrylic, methacrylic or maleic acid or more preferably by copolymerization of acrylic and/or methacrylic acid with an unsaturated dicarboxylic acid, such as maleic acid in the alkaline peroxide bleaching of a cellulosic fibre material, the polycarboxylate polymer will bind the alkaline earth metal ions, especially calcium ions, and thus improve the performance of the poly-alpha-hydroxyacrylic polymer.

It has also been found that the alkaline earth metal ions can be very detrimental for PHAA. When paper is made from a mechanical pulp, is it very common to feed the so-called white water from the paper making process to the pulping process. The white water contains very often high contents of calcium ions, when calcium containing coating pigments or fillers have been used in the paper making process.

If PHAA is used alone it will bind calcium and magnesium ions and render PHAA less effective due to the content of alkaline earth metal ions. The reason of this is not known, since e.g. the sodium salt of PHAA and a sodium salt of a conventional polyacrylic acid have almost the same calcium binding ability in the presence of magnesium at neutral pH, while the degree of binding of magnesium is much weaker but stronger for the polyacrylate than for the sodium salt of PHAA. [T. Tamura et al., Polymer International 46 (1998), 353-356].

According to the present invention it was surprisingly found that by using an acidic polycarboxylate made by homopolymerization of acrylic or methacrylic acid or more preferably by copolymerization of acrylic and/or methacrylic acid with an unsaturated dicarboxylic acid, such as maleic acid, and adding this polymer to an alkaline solution of PHAA or a salt thereof, the efficiency of PHAA could be maintained. This meant that a smaller amount of the effective and expensive component, i.e. PHAA, could be used compared the situation where PHAA is used alone.

The process according to the invention can be used in the bleaching of all kind pulps, chemical pulp, mechanical, chemi-mechanical pulp and deinked pulps, which use hydrogen peroxide as the bleaching agent. The process is also suitable in deinking of recycled pulps, in which water glass and hydrogen peroxide is commonly used.

The process for invention can be practiced as a single stage of bleaching or in a two-stage process, where the pre-bleached pulp is entering the second stage, Any consistency can be used, but it is most preferable to use medium consistency in the first stage and high consistency in the second stage.

If needed, the bleaching can be preceded by a treatment with chelating agent in order to reduce the amount of transition metals entering the bleaching process. If the manganese content is still high after this kind of treatment, chelating agents can be added to the bleaching either with the stabilizing agent or separately.

In de-inking process the polymer composition can be used in repulping or disperger or in a separate bleaching stage or any process stage where hydrogen peroxide is present.

According to the invention the polymers should be fed into the process separately from the alkali. A ready-made bleaching mixture is not preferred, since the alkali will precipitate the polymers and render the bleaching ineffective. The polymers can be fed diluted with water, but it has been surprisingly found that the best effect can be achieved, when the two polymers, PHAA and the polycarboxylate, are fed as a concentrated solution before the alkali or the two polymers are fed separately, but not together with alkali.

DETAILED DESCRIPTION OF THE INVENTION

According to the present invention there is provided a process for bleaching a cellulosic fibre material with a peroxide compound in an aqueous alkaline medium, comprising a bleaching step wherein a) a first polymer (A) comprising a homopolymer of acrylic acid, methacrylic acid or maleic acid, or a copolymer of acrylic acid and/or methacrylic acid with an unsaturated dicarboxylic acid, and a solution of a second polymer (B) comprising a poly-alpha-hydroxyacrylic acid or a salt thereof, are added to a cellulosic fibre material, and b) thereafter adding a peroxide compound and an alkaline substance and carrying out the bleaching.

It should be noted that a) and b) are carried out in the same bleaching step meaning that there is no washing between a) and b), and that b) is carried out essentially immediately after the addition of the two polymers to the cellulosic fibre material.

Preferably the bleaching is carried out in the absence of a nitrogen-containing chelating agent.

Preferably the bleaching is also carried out in the absence of added calcium and/or magnesium ions meaning that calcium and/or magnesium ions are not by purpose introduced into the process.

In a preferred embodiment of the invention the polymers (A) and (B) are added in the form of a stable solution containing both polymers. This polymer solution has a pH of at most 7, preferably at most 6, and more preferably at most 5.

Preferably said first polymer (A) comprises a raw polymer obtained from the homopolymerization of acrylic acid, methacrylic acid or maleic acid or from the copolymerization of acrylic acid and/or methacrylic acid with an unsaturated dicarboxylic acid, said raw polymer having a pH of below 7, preferably below 6, and more preferably below 5. Said unsaturated dicarboxylic acid is preferably maleic acid. This polycarboxylic acid polymer can be made using conventional radical polymerization techniques.

In addition to the above monomers, the copolymer can also contain any other copolymerizable monomer units, such as acrylamide, (meth)acrylic esters or methyl vinyl ether, to name a few. The term "copolymer" here refers to a polymer containing two or more different types of monomer units.

The mixing of the two polymers can be utilized using any applicable mixing technique to get a uniform mixture.

The first polymer (A) can have a molecular weight of at least 4000, preferably at least 10000, and more preferably at least 30000. The molecular weight can be even higher, although with very high molecular weights the viscosity of the product will increase considerably at high concentrations.

The solution of the second PHAA polymer (polymer (B)) has an alkaline pH. The second polymer (B) can have a molecular weight of at least 5000, preferably at least 10000, and more preferably at least 15000 (calculated as the sodium salt of the PHAA). The salt of the second polymer is preferably an alkali metal salt, especially a sodium salt.

Preferably the first polymer (A) comprises a copolymer of acrylic acid and/or methacrylic acid with maleic acid, wherein the molar ratio of acrylic acid and/or methacrylic acid to maleic acid is from 80:20 to 20:80, preferably from 70:30 to 50:50.

The ratio between polymer (A) and (B) can be varied to large extent, but the ratio should be selected so that good alkaline-earth metal, especially calcium binding by the polymer (A) can be obtained in order to achieve an optimal bleaching effect of the polymer mixture.

The amount of the polycarboxylate (polymer (A)) will depend on the alkaline-earth metal, especially the calcium content in the process, but the share of the PHAA polymer (polymer (B)) can be 1 to 50% by weight, preferably 5 to 30% by weight and most preferably 10 to 20% by weight of the total amount of the polymers in the mixture.

According to the invention the polymers (A) and (B) as active material can be added in a total amount of 0.05 to 10 kg per ton of dry cellulosic fibre material, preferably in an amount of 0.1 to 5 kg per ton of dry cellulosic fibre material, and more preferably in an amount of 1 to 5 kg per ton of dry cellulosic fibre material.

According to the invention the alkaline PHAA (polymer (B)) can be mixed or can be fed together with a raw acidic polycarboxylate polymer (polymer (A)). These features will regulate the final pH of the polymer mixture or the system if the polymers are fed separately.

The cellulosic fibre material can be a chemical, mechanical, chemi-mechanical or deinked pulp. The cellulosic fibre material can also be any regenerated cellulose material, such as viscose, flax or cotton.

The normal content of active material for the polymer solution will be at least 10%, preferably at least 15%, and more preferably at least 20% by weight, but also more diluted solutions can be used in the application process.

The peroxide bleaching of mechanical pulps with the process according to the invention can comprise all kind of mechanical pulps, e.g. stone groundwood pulp (SGW), refiner mechanical pulp (RMP), pressure groundwood (PGW), thermomechanical pulp (TMP), but also chemically treated high-yield pulps such as chemithermomechanical pulp (CTMP). The invention is also useful in bleaching of deinked pulps. Deinked pulp can be made using mixed office waste (MOW), newsprint (ONP), magazines (OMG) etc. as raw material and the polymer mixture can be used in any process stage where peroxide is used. The invention can also be practiced in refiner bleaching of mechanical pulps and in alkaline peroxide mechanical pulp (APMP), in which wood chips are impregnated with alkaline peroxide solution before refining. In these applications the invention is very advantageous, since the biggest obstacle to use of hydrogen peroxide in these applications has been that water glass cannot be used, since they will e.g. fasten to the refiner plates and thus making the process unpractical.

The residence time in the bleaching can vary within a wide range, from 30 to 240 minutes, preferably from 45 to 180 minutes and most preferably from 60 to 120 minutes. The residence time will also depend on the temperature used in the bleaching.

The bleaching of mechanical pulps can be carried out at a temperature of 30-90° C., preferably at a temperature of 50-90° C. The bleaching can be carried out at a consistency of choice, but it is most preferably to carry out the bleaching at a high consistency, i.e. about 30% or higher. Bleaching can also be carried in two stages with a dewatering stage between the stages. The stages can be carried out at a consistency of choice, but it is most preferably to use medium consistency in the first stage and a high consistency in the second stage. This makes it possible to remove the detrimental substances efficiently. A chelating agent stage and dewatering can precede the bleaching stage and thus improve the bleaching performance. The consistency of this pretreatment is preferably around 10% in order to ensure an efficient metal removal. The pH should be from 3 to 7, preferably 4 to 6.5 and most preferably from 4.5 to 6, if conventional chelating agents are used. Conventional chelating agents, such as polyaminopolycarboxylates, such as EDTA or DTPA or the corresponding phosphonic acids such as EDTMPA and DTPMPA can be used as the chelating agents.

The ratio between the alkali and hydrogen peroxide can vary in a wide range, depending on raw materials and degree of bleaching. Also alternative alkali sources, like sodium carbonate, can be utilized.

The polymer composition shall most preferably be fed separately from the alkali feed. This can be put into practice by having different feeding points at the pumping section. Another possibility is to dilute the alkali, add hydrogen peroxide and add almost simultaneously this polymer composition, so that the polymer composition has no possibility to precipitate before the chemicals have been mixed with the pulp.

In a de-inking process the polymer composition according to the invention can be used in repulping or disperger or in a separate bleaching stage or any process stage where hydrogen peroxide is present.

The pH in the alkaline bleaching, including the de-inking in the presence of hydrogen peroxide, is from 7 to 13, preferably from 7 to 12, and more preferably from 7 to 11.

The present invention will be illustrated by following examples.

Example 1

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution was diluted to active content 24% by weight. The pH of the solution was about 4.

The copolymer solution was mixed with a PHAA polymer (as an alkaline sodium salt) having a weight average molecular weight of about 30000 and an active content of 30% by weight. The active content ratio PHAA:copolymer A was 1:4. The mixture was a clear product having pH 4.8, dry content 24% by weight and viscosity about 50 mPas at 25° C. The solution remained clear for several days.

Example 2

A polyacrylate copolymer (copolymer A) was made using conventional radical copolymerization technique from acrylic acid and maleic acid in molar ratio 60:40. The weight average molecular weight of the copolymer was about 44000 g/mol. The active content of the copolymer solution was 44% by weight. The pH of the solution was about 4.

The copolymer solution was mixed with a PHAA polymer (as an alkaline sodium salt) having a weight average molecular weight of about 30000 and an active content of 30% by weight. The active content ratio PHAA:copolymer A was 1:4. The mixture was a clear product having pH 4.5, dry content 40% by weight and viscosity about 950 mPas at 25° C. The solution remained clear for several days.

Example 3

A polyacrylate copolymer (copolymer A) was made using conventional radical copolymerization technique from acrylic acid and maleic acid in molar ratio 60:40. The weight average molecular weight of the copolymer was about 44000 g/mol.

The copolymer solution was diluted to an active content of 24% by weight. The pH of the solution was about 4.

The copolymer solution was mixed with a PHAA polymer (as an alkaline sodium salt) having a weight average molecular weight of about 30000 and an active content of 30% by weight. The active content ratio PHAA:copolymer A was 3:20. The mixture was a clear product having pH 4.7, dry content 24% by weight and viscosity about 90 mPas at 25° C. After that the pH of solution was raised to 6.4 using sodium hydroxide. The final solution was at first turbid. After 3 days the turbidity was decreased, and after 9 days solution was clear.

Example 4

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution was diluted to an active content of 24% by weight. The pH of the solution was about 4.

The copolymer solution was mixed with a PHAA polymer (as an alkaline sodium salt) having a weight average molecular weight of about 30000 and an active content of 30% by weight. The active content ratio PHAA:copolymer A was 1:3. The mixture was a clear product and remained clear for several days.

Reference Example 1

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution had initially a pH of about 4, and the pH was adjusted to 8 using sodium hydroxide. The copolymer solution was diluted to an active content of 20% by weight.

The copolymer solution was mixed with a PHAA polymer (as an alkaline sodium salt) having a weight average molecular weight of about 30000 and an active content 30% by weight. The active content ratio PHAA:copolymer A was 1:4. The mixture was at first a clear product having pH of 7.3, dry content 24% by weight and viscosity about 100 mPas at 25° C. After 1 day the solution became turbid and separated into two layers.

Example 5

Effect of Ca and Mg Addition on the Peroxide Stability

The effect of polymer samples on the stability of an alkaline peroxide solution were tested. In all the tests 2 mg/l of Fe ions and 2 mg/l of Mn ions were added. The tests were carried out at pH 10 and at a temperature of 50° C. The concentration of hydrogen peroxide was determined after 30 minutes reaction time. The results are shown in Table 1. Following polymer samples were used a) poly-alpha-hydroxyacrylate as a sodium salt (40 mg/l), Mw 30000 b) the polymer composition of Example 1 (poly-alpha-hydroxyacrylate+AA-MA copolymer 1:4 w:w) (100 mg/l)

TABLE 1

| Mg, | Ca, | Residual $H_2O_2$% of original (3 g/l) | |
|---|---|---|---|
| mg/l | mg/l | a) | b) |
| 0 | 0 | 98 | 97 |
| 10 | 0 | 36 | 96 |
| 20 | 0 | 36 | 88 |
| 40 | 0 | 25 | 76 |
| 0 | 0 | 98 | 98 |
| 0 | 10 | 15 | 97 |
| 0 | 20 | 10 | 90 |
| 0 | 40 | 10 | 74 |

As can be seen from the table, the addition of alkaline earth metals has an adverse effect on peroxide stability. The polymer composition according to present invention gives better stability in the presence of alkaline earth metals. It has to be noticed that a test without pulp will not always reflect the conditions when pulp is present with the associated transition metals ions.

Example 6

Commercial pulp samples were bleached at 30% consistency, 70° C. for 120 minutes using 35 kg/dry ton $H_2O_2$ and 35 kg NaOH for PGW and 15 kg $H_2O_2$+15 kg NaOH for CTMP and 1 kg/dry ton polymer. The pulps were treated first with 2 kg/dry ton DTPA and dewatered in mill before the sampling place. Magnesium was added as $MgSO_4$. The "polymer blend" of Example 1 is a mixture of PHAA and maleic acid-acrylic acid copolymer (1:4 w:w). The polymer blend and the reference PHAA were added as 1% water solution directly in the pulp before the other chemicals. The PGW pulp contained Fe 4.6 mg/kg, Mn 1.5 mg/kg, Ca 610 mg/kg, Mg 87 mg/kg, Ba 4.2 mg/kg, Cu, Cr, Ni, Mo <0.5 mg/kg and the CTMP pulp contained Fe 4.1 mg/kg, Mn 2.2 mg/kg, Ca 350 mg/kg, Mg 87 mg/kg.

The initial brightness was 68.0% ISO and 56% ISO respectively. The results are shown in Table 2.

TABLE 2

| | PGW (Aspen) | | | | CTMP | | | |
|---|---|---|---|---|---|---|---|---|
| MgSO$_4$ | PHAA only | | Polymer blend | | PHAA only | | Polymer blend | |
| kg/dry ton | H$_2$O$_2$-Residue | Brightness % ISO | H$_2$O$_2$-Residue | Brightness % ISO | H$_2$O$_2$-Residue | Brightness % ISO | H$_2$O$_2$-Residue | Brightness % ISO |
| 0 | 17.2 | 82.9 | 17.4 | 83.1 | 10.5 | 66.8 | 11 | 67.2 |
| 2 | 15.8 | 82 | 16 | 83 | | | | |

Here can be seen that added magnesium decreased the brightness and when using the polymer blend a better performance was obtained than when using PHAA only.

Example 7

A common practice both in laboratory and mill scale is to prepare bleaching liquor containing hydrogen peroxide, alkali and stabilizer (e.g. waterglass) before adding them into the pulp. Following experiments were carried out in order to evaluate different modes of adding the polymer. In all experiments the polymer composition of Example 1 was used.

A) The bleaching chemicals were added directly to the pulp in the order: polymer —NaOH —hydrogen peroxide B) The chemicals were mixed before addition (30% polymer solution, 10% NaOH, 50% H$_2$O$_2$)

C) NaOH was first diluted to 1:10 (10%→1%), then hydrogen peroxide was added and the diluted polymer (1% solution) was mixed with them and immediately mixed in the pulp slurry.

The bleaching results are shown in Table 3.

TABLE 3

| | H$_2$O$_2$-residue | Brightness, % ISO |
|---|---|---|
| A) | 11 | 67.2 |
| B) | 2.5 | 62.6 |
| C) | 10.7 | 67 |

The bleaching result of experiment B) was poor because of precipitation of the polymer when it was blended with NaOH and peroxide. The example clearly shows that the polymer should be added directly to the pulp or the bleaching liquor should be diluted before addition of the polymer in order to prevent precipitation of the polymer and added immediately to the pulp.

Example 8

A commercial TMP (spruce) sample was bleached using similar reaction conditions as in example 6 except for the consistency which was 12%. The pulp contained Ca 696 ppm, Fe 6.2 ppm and Mn 15.6 ppm. The results are shown in Table 4 below.

TABLE 4

| | No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Initial pH | 9.6 | 10 | 9.7 | 9.3 | 10 | 9.8 | 10.2 | 10.2 | 10.2 | 10.2 | 10.2 | 10.2 |
| Final pH | 7.6 | 8.8 | 7.3 | 7.6 | 7.6 | 8.5 | 8.8 | 8.6 | 8.4 | 8.7 | 8.7 | 8.7 |
| H$_2$O$_2$, kg | 25 | 25 | 25 | 25 | 25 | 25 | 25 | 25 | 25 | 25 | 25 | 25 |
| NaOH, kg | 20 | 25 | 22.1 | 22.1 | 22.1 | 27 | 27 | 27 | 27 | 27 | 27 | 27 |
| Waterglass, kg | 18 | 18 | 0 | 0 | 0 | 0 | 0 | 0 | 0 | 0 | 0 | 0 |
| PAA1, kg | 0 | 0 | 0 | 1 | 0 | 0 | 0 | 0 | 0 | 0 | 0 | 0 |
| PAA2, kg | 0 | 0 | 0 | 0 | 0 | 0 | 0 | 0 | 1 | 0.6 | 0 | 0 |
| PHAA1, kg | 0 | 0 | 0.25 | 0.25 | 0.25 | 0 | 0.15 | 0.25 | 0.25 | 0.15 | 0.15 | 0.25 |
| AA-MA1, kg | 0 | 0 | 0 | 0 | 1 | 0 | 0 | 0 | 0 | 0 | 0.6 | 1 |
| Residual H$_2$O$_2$, kg | 15.5 | 13.4 | 14.6 | 16.7 | 16.2 | 0.5 | 0.9 | 2.1 | 4.3 | 2 | 14.9 | 14.9 |
| Brightness, % ISO | 70.2 | 71.3 | 69.2 | 70.5 | 70.8 | 67.1 | 68.2 | 67.8 | 69.1 | 68.8 | 71.1 | 70.9 |

The above amounts are calculated as kg active material per dry ton.

PAA1 is a polyacrylic acid; Mw 200000.

PAA2 is a sodium salt of polyacrylic acid, Mw 3000.

PHAA1 is a sodium salt of poly-alpha-hydroxyacrylic acid; Mw 20000.

AA-MA1 is a sodium salt of the copolymer of acrylic acid and maleic acid in the molar ratio of 60:40; Mw 44000.

As can be seen, low-molecular weight polyacrylate (PAA2) is not as efficient as high-molecular weight products (PAA1 and AA-MA1), in respect of the amount of residual peroxide and brightness. PHAA1 as such is quite efficient with low alkali charge, but an increase of the alkali charge reduces the stability of hydrogen peroxide. Calcium-binding polymer, polyacrylate with the molecular weight of 200000 (PAA1) or the polycarboxylate made by copolymerization of acrylic and maleic acid with the molecular weight of 44000 (AA-MA1), can improve the bleaching result.

Example 9

Effect of Calcium and on the Peroxide Stability

This example demonstrates the effect of calcium and different acrylate-based polymers on peroxide stability. The test was carried out as in Example 5. The Fe content was 2 ppm, Mn 2 ppm and calcium 10 ppm. The amount of PHAA in each case was 40 ppm and the other polymer 100 ppm. The results are shown in Table 5.

TABLE 5

| | time/min | peroxide conc. in g/l | | | | | |
|---|---|---|---|---|---|---|---|
| | 0 | 5 | 10 | 15 | 30 | 60 | 90 |
| Fe 2 ppm, Mn 2 ppm, Ca 10 ppm | | | | | | | |
| PHAA1 40 ppm | 3 | 2.52 | 2.11 | 1.51 | 0.54 | 0.007 | 0.00 |
| PHAA1 + PAA2 | 3 | 2.82 | 2.62 | 2.42 | 1.47 | 0.29 | 0.007 |
| PHAA1 + PAA1 | 3 | 2.99 | 2.98 | 2.96 | 2.91 | 2.84 | 2.75 |
| PHAA1 + AA-MA2 | 3 | 2.79 | 2.61 | 2.34 | 1.58 | 0.24 | 0.005 |
| PHAA1 + AA-MA1 | 3 | 3 | 2.95 | 2.92 | 2.84 | 2.61 | 2.42 |
| Without the presence of Ca | | | | | | | |
| PHAA1 40 ppm | 3 | 3 | 3 | 2.99 | 2.99 | 2.97 | 2.97 |
| PHAA1 + AA-MA1 | 3 | 3 | 3 | 2.98 | 2.99 | 2.97 | 2.97 |

PAA1 is polyacrylic acid; Mw 200000.

PAA2 is a sodium salt of polyacrylic acid, Mw 3000.

PHAA1 is a sodium salt of poly-alpha-hydroxyacrylic acid; Mw 20000

AA-MA1 is a sodium salt of the copolymer of acrylic acid and maleic acid in the molar ratio of 60:40; Mw 44000.

AA-MA2 is a sodium salt of the copolymer of acrylic acid and maleic acid in the molar ratio of 70:30; Mw 7000.

As can be seen from the results, the polycarboxylate polymers with relatively high molecular weight give the best stability. This example also shows that in the presence of calcium the use of acrylate-based polymer enhances the stabilization efficiency.

Example 10

Bleaching with Different PHAA-Polymer Ratios

The bleaching experiments were carried out as in Example 8. The pulp was PGW (spruce) having an initial brightness of 62% ISO. The bleaching tests were carried out for chelated pulp (chelated with 2 kg DTPA) containing Fe 20 ppm, Mn 1.2 ppm and Ca 974 ppm. The results are shown in Table 6. Following stabilizers were used in the tests:

Stabilizer 1 Waterglass $SiO_2:Na_2O$ 2.5:1, 30.8% $SiO_2$

Stabilizer 2 PHAA2

Stabilizer 3 PHAA2+AA-MA1; 33:67 w/w

Stabilizer 4 -"-; 25:75 w/w

Stabilizer 5 -"-; 10:90 w/w

TABLE 6

| | | Final brightness, % ISO | | | | | Residual $H_2O_2$ | | | | |
|---|---|---|---|---|---|---|---|---|---|---|---|
| | | Stabilizer | | | | | | | | | |
| | | Stab1 | Stab2 | Stab3 | Stab4 | Stab5 | Stab1 | Stab2 | Stab3 | Stab4 | Stab5 |
| *) | 0 kg/tp | 69.7 | 69.7 | 69.7 | 69.7 | 69.7 | 6.1 | 6.1 | 6.1 | 6.1 | 6.1 |
| | 0.5 kg/tp | | 73.4 | 73.4 | 73 | 71.5 | | 10 | 8.3 | 8.6 | 7 |
| | 1 kg/tp | | 73.6 | 73 | 73.2 | 72.4 | | 12.1 | 9.2 | 9.8 | 7.6 |
| | 2 kg/tp | | 74.1 | 73.7 | 73.4 | 72.6 | | 13.3 | 11.5 | 11.1 | 8.9 |
| | 4 kg/tp | | | 72.7 | 74.2 | 73.5 | | | 13.6 | 12.9 | 11.6 |
| | 6 kg/tp | | | | | 73 | | | | | 13.2 |
| **) | 7.5 kg/tp | 71.3 | | | | | 6.3 | | | | |
| | 15 kg/tp | 73.2 | | | | | 10.4 | | | | |
| | 25 kg/tp | 74.2 | | | | | 14 | | | | |
| | 30 kg/tp | 72.8 | | | | | 15.3 | | | | |

*) As Na-salt of the polymers

**) As solution containing 30.8% $SiO_2$

The amounts of the stabilizers are expressed as kg per ton dry pulp.

PHAA2 is a sodium salt of poly-alpha-hydroxyacrylic acid; Mw 30000.

AA-MA1 is a sodium salt of the copolymer of acrylic acid and maleic acid in the molar ratio of 60:40; Mw 44000.

The test results show that good bleaching results are obtained by using the polymer composition (stabilizers 3, 4 and 5), thus making it possible to decrease the amount of the more expensive sodium salt of poly-alpha-hydroxyacrylic acid (PHAA2).

Example 11

Bleaching of De-Inked Pulp

Mixed office waste was de-inked in mill scale and the sample for laboratory bleaching was taken from the thickener before peroxide bleaching. The pulp was treated with chelating agents and pre-bleached with dithionite in the mill. No silicate was used in any process stage before the sampling place. High-consistency peroxide bleaching was carried out using silicate and polymer as stabilizer. The results are shown in the Table 7.

TABLE 7

| Time, min | | 80 | 80 | 80 | 80 | 80 | 80 | 80 |
|---|---|---|---|---|---|---|---|---|
| Temperature, °C. | Unbleached | 73 | 73 | 73 | 73 | 73 | 73 | 73 |
| Consistency, % | | 26 | 26 | 26 | 26 | 26 | 26 | 26 |
| $H_2O_2$, kg/tp | | 12 | 12 | 12 | 12 | 12 | 12 | 12 |
| NaOH, kg/tp | | 3.5 | 3.5 | 3.5 | 3.5 | 3.5 | 3.5 | 3.5 |
| Waterglass, kg/tp | | 8 | | | | | | |
| PHAA2, kg/tp | | | 0.5 | | 1 | 0.5 | 1 | 0.25 |
| AA-MA1, kg/tp | | | | 2.2 | | 2.2 | 1.4 | 2.2 |
| Residual $H_2O_2$, kg/tp | | 6.6 | 1.1 | 0.1 | 6.2 | 3.5 | 7.8 | 2.8 |
| CIE whiteness | 109 | 106 | 104.9 | 104.8 | 105.5 | 109.8 | 107.5 | 104.7 |
| Brightness, % ISO (R457 UV on) | 85.1 | 90.4 | 89 | 89.4 | 89.2 | 90.7 | 90.7 | 89 |
| R457 UV off | 77.5 | 84.7 | 83.1 | 83.2 | 83.2 | 84.3 | 83 | 83 |
| According to the invention | | No | No | No | No | Yes | Yes | Yes |

PHAA2 is a sodium salt of poly-alpha-hydroxyacrylic acid; Mw 30000.

AA-MA1 is a sodium salt of the copolymer of acrylic acid and maleic acid in the molar ratio of 60:40; Mw 44000.

The results show that by using the polymer composition of the invention (PHAA2+AA-MA1) good peroxide stability as well as good brightness are obtained.

The invention claimed is:

1. A process for bleaching a cellulosic fibre material with a peroxide compound in an aqueous alkaline medium, comprising a bleaching step wherein
   a) a stable polymer solution comprising a first polymer (A) comprising a homopolymer of acrylic acid, methacrylic acid or maleic acid, or a copolymer of acrylic acid and/or methacrylic acid with an unsaturated dicarboxylic acid, and a second polymer (B) comprising a poly-alpha-hydroxyacrylic acid or a salt thereof, said polymer solution having a pH of at most 5, is added to a cellulosic fibre material, and
   b) thereafter adding a peroxide compound and an alkaline substance and carrying out the bleaching;
   wherein step (b) is carried out essentially immediately after the addition of the polymer solution to the cellulosic fibre material, without a washing step between steps (a) and (b).

2. The process of claim 1, wherein the bleaching is carried out in the absence of a nitrogen-containing chelating agent.

3. The process of claim 1 or 2, wherein the bleaching is carried out in the absence of added calcium and/or magnesium ions.

4. The process of claim 1, wherein the first polymer (A) comprises a raw polymer obtained from the homopolymerization of acrylic acid, methacrylic acid or maleic acid or from the copolymerization of acrylic acid and/or methacrylic acid with an unsaturated dicarboxylic acid, said raw polymer having a pH of below 7.

5. The process of claim 4, in which the raw polymer has a pH below 6.

6. The process of claim 4, in which the raw polymer has a pH below 5.

7. The process of claim 1, wherein the first polymer (A) has a molecular weight of at least 4000.

8. The process of claim 1, wherein the first polymer (A) has a molecular weight of at least 10000.

9. The process of claim 1, wherein the first polymer (A) has a molecular weight of at least 30000.

10. The process of claim 1, wherein the second polymer (B) has a molecular weight of at least 5000.

11. The process of claim 1, wherein the second polymer (B) has a molecular weight of at least 10000.

12. The process of claim 1, wherein the second polymer (B) has a molecular weight of at least 15000.

13. The process of claim 1, wherein the first polymer (A) comprises a copolymer of acrylic acid and/or methacrylic acid with maleic acid, wherein the molar ratio of acrylic acid and/or methacrylic acid to maleic acid is from 80:20 to 20:80.

14. The process of claim 1, wherein the first polymer (A) comprises a copolymer of acrylic acid and/or methacrylic acid with maleic acid, wherein the molar ratio of acrylic acid and/or methacrylic acid to maleic acid is from 70:30 to 50:50.

15. The process of claim 1, wherein the share of the second polymer (B) is from 1 to 50% by weight of the total amount of the first and second polymers (A) and (B).

16. The process of claim 1, wherein the polymers (A) and (B) as active material are added in a total amount of 0.05 to 10 kg per ton of dry cellulosic fibre material.

17. The process of claim 1, wherein the polymers (A) and (B) as active material are added in a total amount of 0.1 to 5 kg per ton of dry cellulosic fibre material.

18. The process of claim 1, wherein the cellulosic fibre material comprises a chemical, mechanical, chemi-mechanical or deinked pulp.

* * * * *